3,198,795
CERTAIN TRIAZOLO-NAPHTHOQUINONE COMPOUNDS

William Lindsay Mosby, North Plainfield, and Mary-Louise Silva, Somerville, N.J., assignors to American Cyanamid Company, Stamford, Conn., a corporation of Maine
No Drawing. Filed May 2, 1963, Ser. No. 277,469
4 Claims. (Cl. 260—247.5)

This invention relates to, and has for its object, the provision of a new class of compounds which may be termed 2 - amino-4,9-dihydro-4,9-dioxo-2H-naphtho[2,3-d]triazoles. It relates further to the novel method by which these paraquinoidal aminotriazoles are prepared, viz: The hydrolysis of the corresponding phosphine imides, which latter also constitute a new class of compounds. It relates still further to the preparation of said phosphine imides by a method which involves treating a vicinal diazido-paraquinone with a member of a certain class of trivalent phosphorous reagents. The invention will be better understood if reference is made to the following detailed description taken in conjunction with the examples showing practice of all the aspects thereof.

The 2-amino-triazolo-paraquinones of the present invention may be represented by the following general formula:

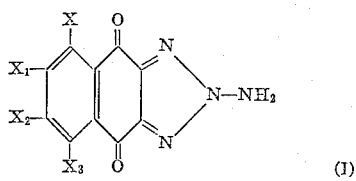

In this formula, the X, $X_1$, $X_2$ and $X_3$ symbols are individually intended to represent either hydrogen, halogen (e.g., fluorine, chlorine, bromine and iodine, especially chlorine and bromine), alkyl (especially lower alkyl such as methyl, ethyl, butyl, hexyl, cyclohexyl and heptyl), alkoxy (especially lower alkoxy such as methoxy, ethoxy and amyloxy), amino, alkanamido (e.g., lower alkanamido) and nitro.

The novel reaction leading to the formation of compounds of Formula I is graphically represented by the following general Equation A:

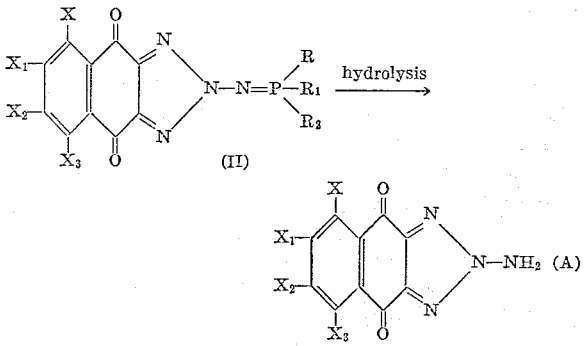

wherein X, $X_1$, $X_2$ and $X_3$ are as defined above, and R, $R_1$ and $R_2$ are individually intended to represent either lower alkyl, monocyclic aryl (e.g., phenyl and tolyl), monocyclic ar(lower alkyl), di-(lower alkyl)amino, merpholino, piperidino or piperazino.

The hydrolysis of Compound II is preferably conducted in water in the presence of a strong acid, e.g., hydrochloric, hydrobromic, sulfuric, phosphoric, nitric, etc. Normally elevated temperatures, up to reflux, are required for the reaction to proceed at a reasonable rate. A polar solvent such as aqueous acetic acid may be employed, but is not necessary. The product, obtained as a colored precipitate, may be separated by filtration and purified by conventional crystallization techniques.

Compounds of Formula I are water-insoluble colored solids, and they are thus useful as pigments or as colorants for plastics.

The phosphoranylideneamino triazolo-paraquinones of Formula II, serving as starting materials in the preparation of Compound I, are themselves new compounds, obtained by the reaction of an aryl phosphine, an alkyl phosphine, aryl phosphonous diamides, diaryl phosphinous amides or a phosphorous triamide with a vicinal diazido-paraquinone.

This novel reaction is graphically represented by the following general Equation B:

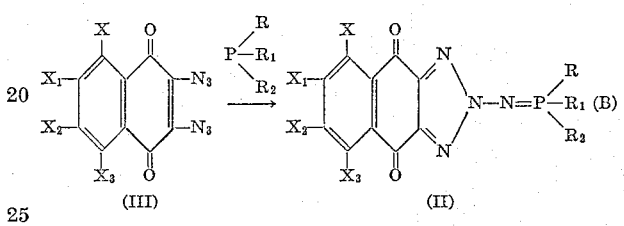

wherein X, $X_1$, $X_2$, $X_3$, R, $R_1$ and $R_2$ are as defined above.

The reaction is carried out in an inert solvent such as toluene, methylene chloride, ethyl acetate, ethylene chloride, benzene, chloroform, chlorobenzene, diethyl ether, dibutyl ether, carbon tetrachloride, nitromethane, etc.

The reaction temperature may be between 20° and 200° C. Normally it is advantageous to carry out the reaction at the reflux temperature of the reaction mixture.

By theory, equivalent amounts of diazido-paraquinone and the phosphorous reagent are required. However, either reactant may be used in slight excess.

The desired phosphoranylideneamino-triazoles may be obtained in the form of colored precipitates. They may be separated from their respective reaction mixtures by filtration, or they can be obtained by evaporating the solvent from the reaction mixture. They can then be purified by conventional recrystallization techniques. They are useful as pigments.

Among the diazido-paraquinones which may be reacted as in Equation B are the following: 2,3-diazido-1,4-naphthoquinone, 2,3 - diazido - 5 - methyl - 1,4 - naphthoquinone, 2,3 - diazido-5-nitro - 1,4 - napthoquinone, 2,3-diazido-5,8-dichloro-1,4-naphthoquinone and 2,3-diazido-5,6,7,8-tetrachloro-1,4-naphthoquinone.

These diazido-paraquinones are generally obtainable by the reaction of the corresponding 2,3-dihalo-1,4-naphthoquinone with two moles of an alkali metal azide (e.g., sodium azide). This reaction is conducted in a solvent medium such as dimethylformamide. After about 15 minutes to one hour, the diazido-paraquinone may be isolated by dilution with water and filtration.

Among the alkyl phosphines which may be employed in Reaction A are the lower alkyl phosphines such as trimethylphosphine, triethylphosphine and tributylphosphine.

Among the triaryl phosphines which may be used are triphenylphosphine, the tritolylphosphines, such as tri-o-tolylphosphine, the cholorophenylphosphines, such as tris(4-chlorophenyl)phosphine, the alkoxyphenylphosphines, such as tris(2-methoxyphenyl)phosphine, trinaphthylphosphines, and also mixed triaryl phosphines, such as diphenyl - p - tolylphosphine, diphenyl-4-methoxyphenylphosphine, dipenyl - 4 - chlorophenylphosphine, phenylbis-p-tolylphosphine, 4-chlorophenyl-bis - p - tolylphosphine.

The phosphorous triamides which may be used include phosphorous tripiperidide, phosphorous trimorpholide, N,N,N',N',N'',N''-hexaethylphosphorous triamide, N,N,N',N',N'',N''-hexaisopropylphosphorous triamide.

As will be obvious from the foregoing description, other trivalent derivatives of phosphorous are useful herein. Thus, fully substituted derivatives of phosphonous diamide (viz: compounds having two amino groups and one aryl group on the phosphorous atom) and phosphinous amide (viz: compounds having one amino group and two aryl groups on the phosphorous atom) may also be employed. Examples of useful phosphonous diamides and phosphinous amides are N,N,N',N'-tetraethyl-P-phenylphosphonous diamide and N,N - diethyl - P,P - diphenylphosphinous amides, respectively.

The following examples are presented to further illustrate the present invention.

*Example 1*

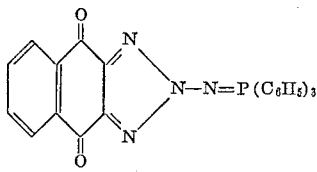

A solution of 2.75 parts (0.0105 mole) of triphenylphosphine in 10 parts of toluene is added slowly to a solution of 1.20 parts (0.005 mole) of 2,3-diazido-1,4-naphthoquinone in 40 parts of toluene at 20–25° C. After heating at the boil until the evolution of gas ceases, the reaction mixture is cooled and the precipitate is removed by filtration. Crystallization from benzene removes a blue by-product, leaving yellow, crystalline material melting at 252–253° C.

*Example 2*

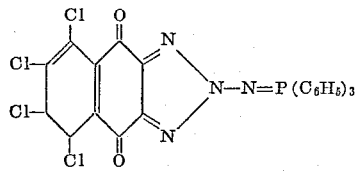

To a suspension of 0.756 part (0.002 mole) of 2,3-diazido-5,6,7,8-tetrachloro - 1,4 - naphthoquinone in 300 parts of methylene chloride there is added 1.15 parts (0.0044 mole) of triphenylphosphine. The reaction mixture is refluxed for about 30 minutes, followed by evaporation of most of the solvent. From the remaining solution there may be separated a scarlet, crystalline product which melts at 294–295° C.

*Example 3*

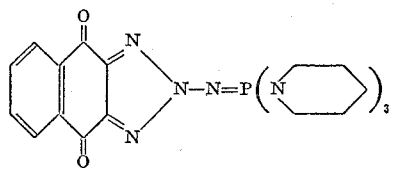

A solution of 2.01 parts (0.0071 mole) of phosphorous tripiperidide in 15 parts of methylene chloride is added slowly to a solution of 0.60 part (0.0025 mole) of 2,3-diazido-1,4-naphthoquinone in 35 parts of methylene chloride. After the reaction mixture is refluxed for about 30 minutes, the methylene chloride is evaporated and the residue is dissolved in benzene. From the benzene solution there is separated a red product, which, after recrystallization, melts at 169–170° C.

*Example 4*

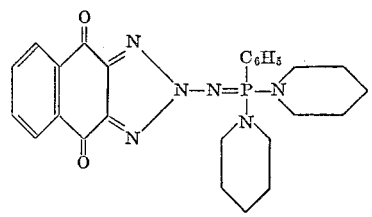

A solution of 6.90 parts (0.025 mole) of phenylphosphonous dipiperidide in about 15 parts of methylene chloride is slowly added to a solution of 2.40 parts (0.01 M) of 2,3-diazido-1,4-naphthoquinone in about 135 parts of methylene chloride at ambient temperature. When the reaction is completed, the solvent is partially evaporated and the precipitate is separated by filtration, washed with benzene, then with petroleum ether and dried. The orange-colored product, after recrystallization from benzene and from ethyl acetate, melts at 212.5–213.5° C.

*Example 5*

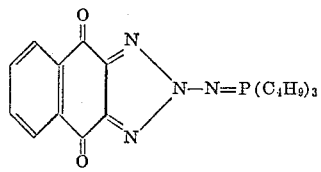

A solution of 4.40 parts of tri-n-butylphosphine in about 15 parts of methylene chloride is added slowly to a solution of 2.40 parts of 2,3-diazido-1,4-napthoquinone in about 135 parts of methylene chloride at ambient temperature. The solvent is removed by evaporation and the red residue is chromatographically fractionated on a column of alumina using benzene as the solvent and eluting liquid. The red fraction is taken up in hexane, and the solution is filtered and evaporated. The red product melts at 76.5–78.0° C.

*Example 6*

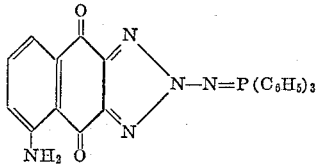

A solution of 2.80 parts of triphenylphosphine in about 15 parts of methylene chloride is slowly added to a solution of 1.32 parts of 5-amino-2,3-diazido-1,4-naphthoquinone in about 30 parts of methylene chloride at ambient temperature. When the reaction is finished, the solvent is evaporated, and the residue is washed with cyclohexane and then with petroleum ether and dried. Extraction with benzene leaves a red-brown material which is crystallized from nitromethane. The product melts at 253.5–254.5° C.

*Example 7*

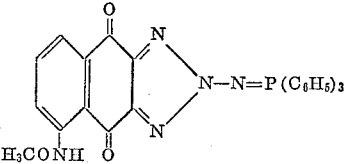

A solution of 5.00 parts of triphenylphosphine in about 15 parts of methylene chloride is added slowly to a solution of 2.60 parts of 5-acetamino-2,3-diazido-1,4-naphthoquinone in about 270 parts of methylene chloride at ambient temperature. When the evolution of gas has ceased, the solvent is partially removed by evaporation. The residual solution is cooled, and the crystalline precipitate is separated by filtration. The product, after washing with ethyl acetate and petroleum ether, extraction with benzene, and recrystallization from nitromethane, melts at 264.6–265.0° C.

Example 8

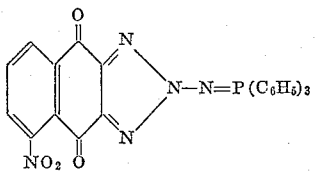

A solution of 5.80 parts of triphenylphosphine in about 10 parts of benzene is added slowly to a suspension of 2.91 parts of 2,3-diazido-5-nitro-1,4-naphthoquinone in about 90 parts of benzene at ambient temperature. The reaction is continued until the mixture becomes green. The solvent is partially evaporated, and the residual solution, when cooled, deposits red crystals which are separated from the green solution by filtration. The product, after recrystallization from nitromethane, melts at 248.5–249.5° C.

Example 9

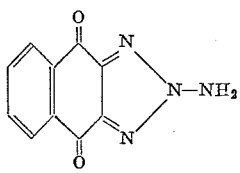

A mixture of one part of the product of Example 1, 40 parts of glacial acetic acid, 3 parts of concentrated hydrochloric acid and 3 parts of water is boiled for five minutes, then diluted with a large volume of water. Filtration yields a yellow solid, M. 313–4° dec. It may be crystallized from hot pyridine.

We claim:

1. A compound having the formula:

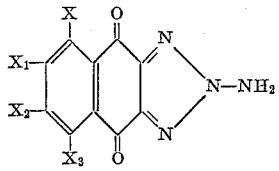

wherein X, $X_1$, $X_2$ and $X_3$ are individually selected from the group consisting of hydrogen, halogen, lower alkyl, lower alkoxy, amino and nitro radicals; no more than one X being amino and no more than one X being nitro in any instance.

2. A process which comprises hydrolyzing a compound having the formula:

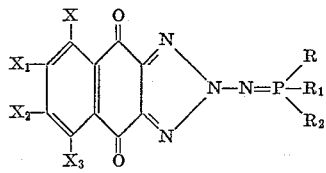

said hydrolysis being effected at an elevated temperature, up to reflux temperature, in an aqueous solution of a strong acid; and recovering from the reaction product a compound having the formula:

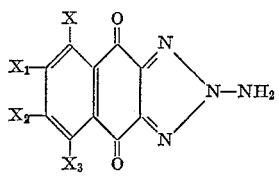

wherein X, $X_1$, $X_2$ and $X_3$ are individually selected from the group consisting of hydrogen, halogen, lower alkyl, lower alkoxy, amino and nitro radicals, no more than one X being amino and no more than one X being nitro in any instance; and R, $R_1$ and $R_2$ are individually intended to represent lower alkyl, phenyl, tolyl, chlorophenyl, methoxyphenyl, naphthyl, di-(lower alkyl)amino, morpholino, pyrrolidino, piperidino and piperazino moieties.

3. A compound having the formula:

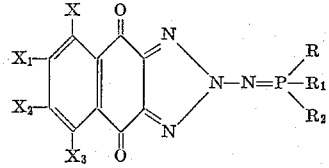

wherein X, $X_1$, $X_2$ and $X_3$ are individually selected from the group consisting of hydrogen, halogen, lower alkyl, lower alkoxy, amino, lower alkanamido and nitro radicals, no more than one X being amino and no more than one X being nitro in any instance; and R, $R_1$ and $R_2$ are individually intended to represent lower alkyl, phenyl, tolyl, chlorophenyl, methoxyphenyl, naphthyl, di-(lower alkyl)amino, morpholino, pyrrolidino, piperidino and piperazino moieties.

4. A process of preparing a triazole having the formula:

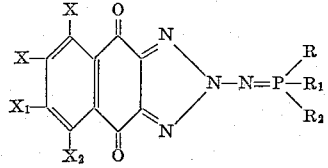

which comprises contacting a compound having the formula:

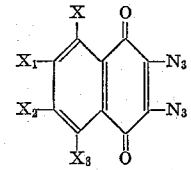

with a trivalent phosphorous compound of the formula:

and recovering the triazole thus formed;

wherein X, $X_1$, $X_2$ and $X_3$ are individually selected from the group consisting of hydrogen, halogen, lower alkyl, lower alkoxy, amino, lower alkanamido and nitro radicals, no more than one X being amino and no more than one X being nitro in any instance; and R, $R_1$ and $R_2$ are individually intended to represent lower alkyl, phenyl, tolyl, chlorophenyl, methoxyphenyl, naphthyl, di-(lower alkyl)amino, morpholino, pyrrolidino, piperidino and piperazino moieties.

No references cited.

NICHOLAS S. RIZZO, *Primary Examiner.*